(12) United States Patent
Dehmer

(10) Patent No.: US 7,473,399 B2
(45) Date of Patent: Jan. 6, 2009

(54) DISPENSING VOLUMES OF LIQUIDS USING A FLAP SEPTUM

(75) Inventor: Bernhard Dehmer, Rastatt (DE)

(73) Assignee: Agilent Technologies, Inc., Santa Clara, CA (US)

( * ) Notice: Subject to any disclaimer, the term of this patent is extended or adjusted under 35 U.S.C. 154(b) by 844 days.

(21) Appl. No.: 10/757,215

(22) Filed: Jan. 14, 2004

(65) Prior Publication Data
US 2004/0234423 A1 Nov. 25, 2004

(30) Foreign Application Priority Data
May 22, 2003 (EP) ................................. 03011617

(51) Int. Cl.
*B01L 3/02* (2006.01)
*B65D 5/50* (2006.01)
*B65D 1/24* (2006.01)
*B65D 25/04* (2006.01)
*B65D 51/20* (2006.01)

(52) U.S. Cl. ..................... 422/99; 422/100; 422/102; 436/180; 206/731; 206/732; 206/733; 206/734; 206/148; 206/149; 220/531; 220/203.01; 220/203.1; 220/203.11; 220/203.16; 220/259.5; 220/260

(58) Field of Classification Search ........... 422/99–100, 422/102; 206/731–734, 148–149; 220/531, 220/202, 203.01, 203.1, 203.11, 203.14, 220/203.16, 259–260; 436/180
See application file for complete search history.

(56) References Cited

U.S. PATENT DOCUMENTS

| | | | |
|---|---|---|---|
| 3,848,579 A | 11/1974 | Villa-Real | |
| 4,562,936 A * | 1/1986 | Deflander | 220/268 |
| 4,591,486 A * | 5/1986 | Eberle | 422/72 |
| 4,769,215 A * | 9/1988 | Ehrenkranz | 422/58 |
| 4,886,089 A * | 12/1989 | Gabrlik et al. | 137/202 |
| 5,125,543 A * | 6/1992 | Rohrabacher et al. | 222/211 |
| 5,202,093 A | 4/1993 | Cloyd | |
| 5,620,662 A * | 4/1997 | Perlman | 422/102 |
| 5,651,940 A * | 7/1997 | Buonaiuto et al. | 422/102 |
| 5,753,186 A * | 5/1998 | Hanley et al. | 422/101 |
| 6,007,778 A * | 12/1999 | Cholewa | 422/82.05 |
| 6,013,230 A * | 1/2000 | Kuchar | 422/104 |
| 6,054,099 A * | 4/2000 | Levy | 422/102 |
| 6,149,866 A * | 11/2000 | Luotola et al. | 422/58 |
| 6,164,449 A * | 12/2000 | Lahti | 206/499 |
| 6,265,225 B1 * | 7/2001 | Otto et al. | 436/180 |
| 6,284,195 B1 | 9/2001 | Lai et al. | |
| 6,408,904 B1 * | 6/2002 | Dushman | 141/352 |
| 6,500,390 B1 * | 12/2002 | Boulton et al. | 506/43 |
| 6,503,455 B1 * | 1/2003 | Kidd | 422/102 |
| 6,516,976 B2 * | 2/2003 | Lewis et al. | 222/321.8 |
| 6,752,965 B2 * | 6/2004 | Levy | 422/99 |
| 6,806,094 B2 * | 10/2004 | Anderson et al. | 436/180 |
| 6,811,752 B2 * | 11/2004 | Barbera-Guillem | 422/100 |
| 6,827,904 B2 * | 12/2004 | Kitagawa | 422/100 |
| 6,841,132 B2 * | 1/2005 | Samsoondar | 422/102 |
| 6,877,639 B1 * | 4/2005 | Hanson | 222/158 |
| 7,229,595 B2 * | 6/2007 | Richardson et al. | 422/101 |

(Continued)

Primary Examiner—Brian R. Gordon
(74) Attorney, Agent, or Firm—Marc Bobys

(57) ABSTRACT

For dispensing volumes of liquids, a hinged septum has a flap inclined with respect to the longitudinal axis of a liquid channel. A deposition device deposits liquid on the flap, wherein the deposition device is arranged to contact the flap.

28 Claims, 2 Drawing Sheets

U.S. PATENT DOCUMENTS

| | | |
|---|---|---|
| 2001/0035222 A1 | 11/2001 | Cour |
| 2002/0057996 A1* | 5/2002 | Bass .......................... 422/102 |
| 2002/0130100 A1* | 9/2002 | Smith ......................... 215/247 |
| 2003/0052074 A1* | 3/2003 | Chang et al. ................. 215/247 |
| 2003/0194349 A1* | 10/2003 | Carey et al. .................... 422/63 |
| 2004/0018634 A1* | 1/2004 | Hajizadeh et al. ........... 436/174 |
| 2004/0067169 A1* | 4/2004 | Krause ........................ 422/100 |
| 2004/0159665 A1* | 8/2004 | Morrissey et al. ............ 220/825 |

\* cited by examiner

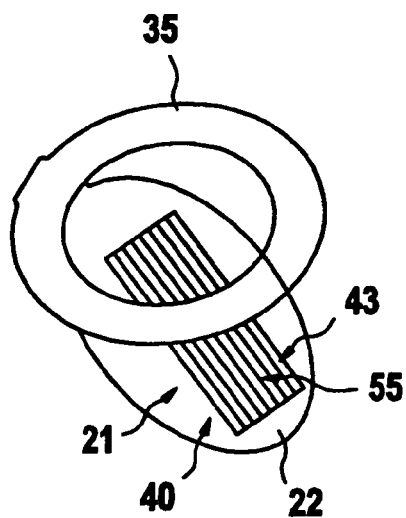
Fig. 4
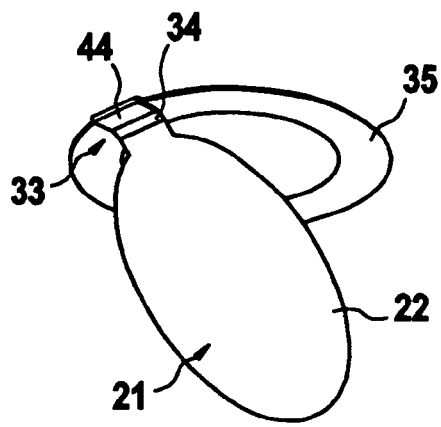
Fig. 5
Fig. 6
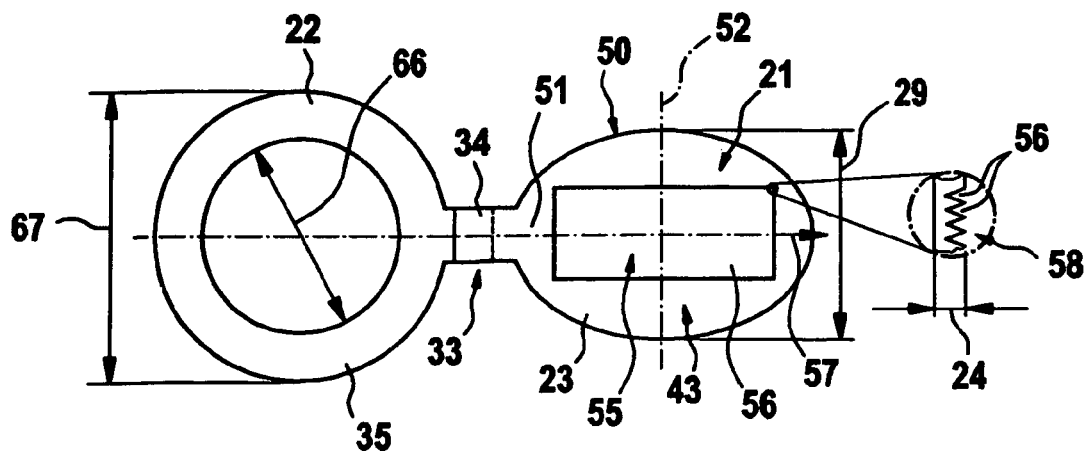

DISPENSING VOLUMES OF LIQUIDS USING A FLAP SEPTUM

BACKGROUND OF THE INVENTION

The invention relates to dispensing volumes of liquids.

Devices called "fraction collectors" are employed for collecting liquid samples in suitable vessels and/or funnels when eluated from a chromatographical column, where the largely continuous streams of liquid must be distributed over the various collection positions. Hollow needles are usually employed for injecting liquids into the vessels or funnels. A liquid buffer, having a volume ranging from 3 µl to 20 µl, may be formed on the tip of the hollow needle in order to counteract the surface tension of the liquid. If, for the types of applications involved, flow rates are low, liquid droplets adhere to the tips of the needle, instead of dropping off. This may have significant influence on the desired distribution within the addressed vessels or funnels. Consequentially, decisions regarding where these liquid droplets should be deposited must be made and the volume of the droplet needs to be controlled. This is preferably done by generating well defined initial and final conditions for the desired fractions.

The following four droplet-deposition methods that allow generating more or less well-defined starting or initial conditions have become known to date:

Under a first method, the tip of the needle is dipped in a liquid contained in a vessel, where it may, however, happen that the side wall of the needle will be wet by the liquid and become contaminated. This means that some of the liquid involved will be transported to the next fraction, well known as 'carry over' which must be avoided, particularly in the case of low flow rates.

A second method that is frequently employed involves depositing droplets on the base of vessels or on the surface of liquids contained in vessels. This method is particularly employed in the case of small sample vessels, such as micro titer plates (well plates) or matrix-assisted laser desorption (MALDI) targets employed in bioanalyses. Of course, depositing droplets on the base of vessels will be possible only if their base has not yet been totally covered with liquid. Other means for depositing droplets on a bounding surface will have to be employed as soon as the latter status has been reached. If the bounding surface involved is the surface of a liquid contained in a vessel, the distance between the tip of the needle and that surface will have to be accurately controlled, and should ideally be adjusted to suit the flow rate and type of liquid involved. Furthermore, the needle will have to be raised in synchronism with the rising levels of liquid in the vessels. This is only possible if all past conditions of the affected liquid/solid surfaces are known. Depositing droplets on the base of sample-collection vessels will, of course, be possible only if the hollow needle employed is sufficiently long. For a given needle length, depositing droplets on the base of sample-collection vessels may thus prove impossible if the vessels involved are too tall.

Under a third method, droplets that form on the tip of the needle are wiped off on a side wall of collection vessels. This, however, requires additional manipulation of the needle and is inapplicable to vessels whose walls taper upward. Another disadvantage of this method is that liquid droplets that have been deposited in this manner remain clinging to the walls of vessels instead of draining down into the bodies of liquid contained therein.

Under a fourth method, droplets that remain clinging to the tip of the needle may be wiped off on prepunctured membranes. Under this method, droplets will remain clinging to the upper surfaces of the membranes and, in addition to the aforementioned disadvantages, there is danger that the side wall of the needle might become contaminated.

In the case of fraction collectors employed for distributing and collecting streams of liquids flowing at relatively high volume flow rates or big sample volume respectively, 3/2-way valves have thus far been preferably employed for diverting liquid to a waste-collection vessel while the needle is in transit between vessels, funnels and/or during waiting periods preceding the start of sample collection. However, employment of such valves is subject to limitations in the case of microfraction collectors, i.e., in cases where streams of liquid flowing at microvolumnar flow rates ranging from, for example, 1 µl/min to 100 µl/min, are to be distributed and collected. The main limitations accure due to the increased external band broadening and the excess volume between valve and needle tip.

SUMMARY OF THE INVENTION

It is an object of the invention to provide an improved dispensing volumes of liquids. The object is solved by the independent claim(s). Preferred embodiments are shown by the dependent claim(s).

According to an embodiment, employment of a flap septum configured in a hinged or flapped manner allows generating extremely well-defined starting or initial and finishing conditions for collecting individual liquid fractions. For example, a hollow needle to be employed for depositing liquid to be collected may simultaneously be employed as a means for opening the septum's flap. The tip of the hollow needle may be positioned on the contacting and drainage surface on the foil on the flap and subsequently translated further forward, toward the second chamber, thereby opening the flap, for that purpose. The liquid involved may then exit from the tip of the needle and come into contact with the foil on the flap, from whence it may be conducted to the second chamber, for example, a collection vessel. The needle may subsequently be withdrawn upward, off the flap, at a particular instant that establishes a defined initial condition associated with the liquid exiting the tip of the needle. A well-defined "breakaway" of the liquid droplet may be obtained in this manner. The elastic restoring force exerted by the springy, elastic hinge allows the flap to close automatically and seal the second chamber in order to prevent liquid that was previously injected into the second chamber from inadvertently leaking out.

The hinged septum according to the invention is particularly beneficial in the case of applications where continuous streams of liquid must be distributed and/or collected. However, one can appreciate that this hinged septum may also be beneficially employed in applications involving intermittent streams of liquid.

No contamination of the side wall of the needle occurs when liquid is deposited on the flap using a suitable deposition device, e.g., an ordinary hollow needle. The means for detecting liquid levels and adjusting the height of the hollow needle that have thus far been necessary may be eliminated.

Various types of sample-collection vessels, in particular, relatively large, tall, sample-collection vessels, whose dimensions may vary within widely separated limits, may now be readily employed, since droplets may be deposited on the readily accessible flap in a simple manner.

Hinged septa in accordance with embodiments of the invention may beneficially be manufactured as stamped parts. However, it should be clear that such hinged septa may also be manufactured from foils that are, preferably, initially planar, employing other, suitable, manufacturing methods, such as laser ablation. Such foils may preferably consist of stainless steel or a plastic material.

The fact that at least the flap consists of a thin, flexible, elastic foil will allow the flap to elastically twist and/or buckle when operated by the actuating device and retracted by the restoring force exerted by its springy, elastic hinge. Within the limits set by its elasticity and flexibility, the flap may also tilt sideward and/or bulge in the middle, which will, beneficially, allow compensating for minor mispositionings of its hinge and/or minor angular misalignments of the flap relative to the liquid channel in order that the second chamber will be reliably sealed off from the first chamber, even under such circumstances, when retracted.

A particularly beneficial embodiment will allow providing that liquid channels have circular, cylindrical inner walls, in which case, the flap will preferably have an elliptical perimeter. The width of the flap, or ellipse, will then preferably be slightly less than, or equal to, the bore diameter of the liquid channel at the sealing zone, and the length of the flap, or ellipse, will exceed the bore diameter of the liquid channel at the sealing zone. This will provide for perfect sealing of the liquid channel by the flap, which is inclined at an angle with respect to the longitudinal axis of the liquid channel. This inclined arrangement of the flap with respect to the longitudinal axis of the liquid channel, and with respect to the earth's gravitational-field vector, will provide that liquid deposited on the flap will be able to automatically run down the flap and into the second chamber under the influence of gravity alone.

BRIEF DESCRIPTION OF THE DRAWINGS

Further benefits, features, and aspects of the invention are as stated in the dependent claims and the descriptive section appearing below, which describes a preferred, sample embodiment of the invention, based on the accompanying figures.

Those figures depict:

FIG. 4 an off-axis, perspective view of the hinged septum according to the invention, as it appears when viewed from above, showing the hinged septum in a folded arrangement, ready for installation;

FIG. 5 an off-axis, perspective view of the hinged septum shown in FIG. 4, as it appears when viewed from below;

FIG. 6 a top view of the hinged septum, shown here in an unfolded arrangement of the flap and sealing gasket.

MORE DETAILED DESCRIPTION OF PREFERRED EMBODIMENTS ACCORDING TO THE INVENTION

Figure 1:
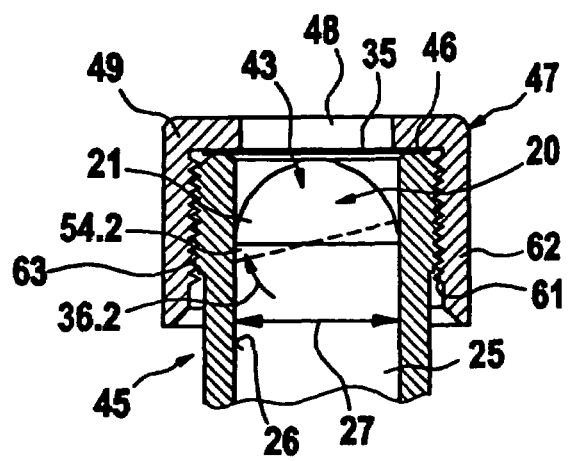
FIG. 1 a sectional view of a tubing section equipped with the hinged septum.

In FIG. 1, the hinged septum 20 generates well-defined initial conditions when dispensing volumes of liquids, and is preferably employed on liquid-separation equipment, in particular, on fraction collectors. The hinged septum 20 essentially comprises a flap 21 and a ring shaped gasket base 35 that are interconnected by a hinge 33. In the case of the sample embodiment shown, the hinged or flap septum 20 consists of a thin, flexible, elastic foil 22. Its flap 21, gasket base 35, and hinge 33 are fabricated from a single sheet of foil. Particularly beneficial materials for fabricating that foil 22 are stainless steel or plastic materials. That foil 22 is sufficiently rigid, flexible, and elastic to allow its meeting the demands imposed on its warping, flexing, and sealing properties.

The flap 21 of the hinged septum 20 has an essentially elliptical shape, i.e., is in the form of an ellipse 50. The ellipse 50 is characterized by a major axis 51 and a minor axis 52 orthogonal thereto. The rim 23 of the flap 21, i.e., the ellipse 50, is shaped such that it matches the contour of the inner wall 26 of a liquid channel 25. The width 29 of the flap 21 in the vicinity of the minor axis 52 of the ellipse 50 is slightly less than, or no more than equal to, the diameter 27 of the right-circular, cylindrical, inner wall 64 of the liquid channel 25.

The flap 21 has a roughened surface 55 on its actuating face 43, which, in the case of this sample embodiment, has numerous hydrophilic and/or hydrophobic microchannels 56 arranged parallel to one another, from the hinge 33 toward the free end of the flap 21; along the direction indicated by the arrow 57. The foil 22 from which the flap 21 is fabricated has a sawtooth profiled cross section 58 in the vicinity of these microchannels 56, when viewed along the minor axis of the ellipse 50. In the case of this sample embodiment, these microchannels 56 thus have V-shaped profiles. These microchannels 56 allow providing an additional, beneficial, capillary action for liquid to be deposited on the actuating face 43 of the flap 21.

Figure 2:
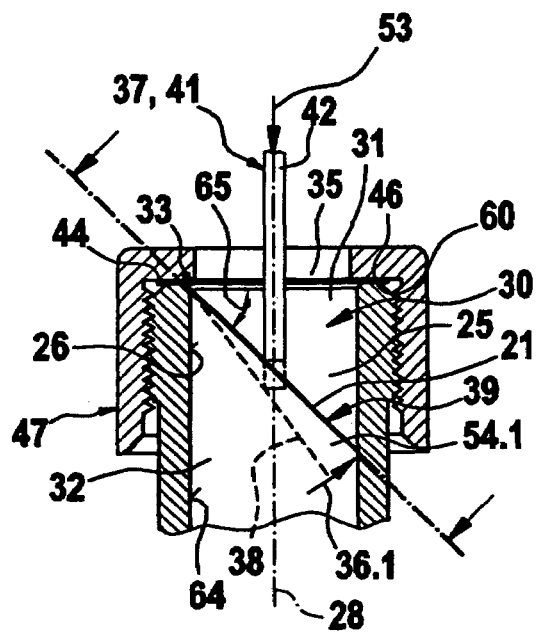
FIG. 2 another sectional view of that tubing section, where the cutting plane is orthogonal to that of FIG. 1, showing the flap in a closed position and schematically depicting the flap in an opened position, following its actuation by a hollow needle employed for depositing a liquid therein.
Figure 3:
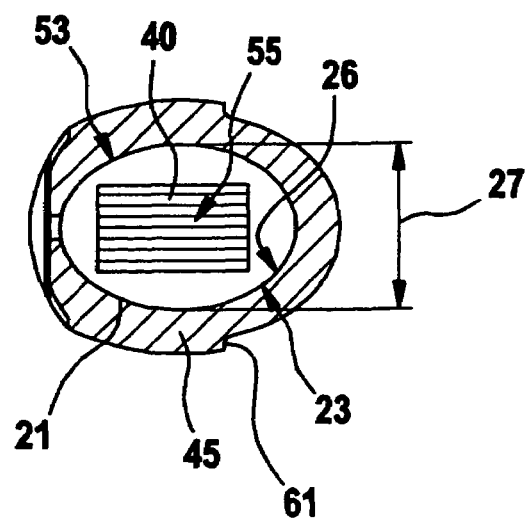
FIG. 3 a sectional view of the tubing section shown in FIG. 2, shown here sectioned along the line 3-3.

That liquid may thus be automatically guided by the roughened surface 55 along the direction indicated by the arrow 57 when the flap 21 of the hinged septum 20 is, in accordance with the invention, installed, or inserted, inclined at an angle with respect to the longitudinal axis 28 of the liquid channel 25, or inclined at an angle with respect to the earth's gravitational-field vector, in particular, as shown in FIG. 2. The roughened surface 55 is arranged such that it entirely within the rim 23 of the flap 21, i.e., is arranged such that lands exist between it and the rim 23, rather than having it extend all the way out to the rim 23, in order that the texture of the material from which the foil 22 is fabricated will remain undamaged in the vicinities of its edge, which is essential for tight sealing.

The hinge 33 is configured in the form of a narrow leaf-spring hinge 34 and arranged in the vicinity of the major axis 51 of the ellipse 50 forming the perimeter of the flap 21, at a location near the latter's edge. This particular location of the hinge 33 allows providing the largest-possible actuating region on the flap 21. However, it should be obvious that the hinge 33, or several hinges, might also be arranged, or distributed, around the rim 23 of the flap 21. However, just a single leaf-spring hinge 34 arranged near its edge, between the minor axis 52 and major axis 51 of the ellipse 50, is preferably employed.

In accordance with the preferred sample embodiment shown in the figures, the hinge 33 is attached to that end of a gasket base 35 diametrically opposite the free end of the flap 21. In this particular case, the gasket base 35 is an annular gasket having an inner diameter 66 and an outer diameter 67. The inner diameter 66 of the gasket base 35 is slightly larger than the diameter 27 of the inner wall of the liquid channel 25 and the outer diameter 67 of the gasket base 35 is slightly larger than the outer diameter of a sealing surface 60 on the upper end 46 of the tubing section 45.

It should be clear that the hinged septum 20 might also be configured using just a flap 21 and a hinge, i.e., without using a sealing gasket. That hinge could be machined on, molded onto, or otherwise attached to, that end of the tubing section 45 opposite the free end of the flap 21 or fixed to the fastener 47, in which case, the flap 21 and hinge should, preferably, also be monolithic and fabricated from a single sheet of foil.

The foil 22 from which the hinged septum 20 is fabricated has a thickness 24 that is a great deal less than the narrowest width of the sealing surface 53 of the flap 21. Its thickness 24 is also a great deal less than the width 29 of the flap 21 across its rim 23, as measured in the vicinity of its minor axis 52. In particular, the thickness 24 of the foil 22 preferably ranges from 10 µm to 200 µm.

The arrangement of the flap 21, hinge 33, and gasket base 35 shown in FIG. 6 corresponds to that which would, for example, be attainable by manufacturing the hinged septum 20 by stamping, using a single sheet of foil 22. However, it should be obvious that any other suitable sort of method might also be employed for manufacturing the hinged septum 20.

Proceeding based on the planar, lengthwise, arrangement of the components, i.e., the flap 21, hinge 33, and gasket base 35, forming the hinged septum 20, in the course of the planned installation of the hinged septum 20, the flap 21 and gasket base 35 are folded over such that that face 43 of the flap 21 on which the roughened surface 55 resides and the (sealing) gasket base 35 face one another, as shown in FIGS. 4 and 5.

A hinged septum 20 that has been preformed prior to installation in that manner may subsequently be installed in, or on, a tubing section 45. The tubing section 45 involved might be a pipe fitting, e.g., a pipe fitting surrounding the neck of a collection vessel employed for collecting a liquid, or a tubular pipe fitting. The tubing section 45 has a liquid channel 25 that is open on one or both ends. In the case of the sample embodiment shown, its liquid channel 25 is bounded by a right-circular, cylindrical, inner wall 64. Orthogonal to its longitudinal axis 28, its liquid channel 25 thus has an inner wall 26 having a circular cross-section having an inner diameter 27.

The tubing section 45 has an upper end 46 that forms a sealing surface 60. Once the hinged septum 20 has been installed, the gasket base 35 of the hinged septum 20 will abut against the upper end 46 of the tubing section 45 as shown, in particular, in FIGS. 1 and 2. That same statement applies to a narrow section of part 44 of the leaf-spring hinge 34, as may, in particular, readily be seen from FIG. 5. That particular part 44 of the leaf-spring hinge 34 will thus be sandwiched between the gasket base 35 and the upper end 46 of the tubing section 45 when the hinged septum 20 is installed therein. When the latter is installed in the manner shown, the gasket base 35 of the hinged septum 20, together with that particular part 44 of the leaf-spring hinge 34, will be clamped in position between the inner surface of a section 49 of a fastener 47 extending beyond the inner wall of the tubing section 45 and the upper end 46 of the tubing section 45. In the case of the sample embodiment shown, the fastener 47 is configured in the form of an internally threaded cap 62 that has an internal thread 63 for screwing it onto a mating external thread 61 on the tubing section 45. The internally threaded cap 62 may thus be screwed onto the tubing section 45 and torqued down. It should be obvious that any other type of fastener 47, for example, snap-on and/or latching fasteners, or other types of fasteners that will allow securely clamping the hinged septum 20 in position, might also be employed instead of the internally threaded cap 62.

As may be seen from, in particular, FIG. 2, when the hinged septum 20 is properly installed, the liquid channel 25 will be sealed off around its circumference by the rim 23 of the flap 21. The rim 23 of the flap 21 will abut against the inner wall 26 of the liquid channel 25 when the flap 21 is in the closed position 39 shown. A deformation of the leaf-spring hinge 34 at the transition between that part 44 thereof that abuts against the upper end 46 of the tubing section 45 and the flap 21 such that the flap 21 will be pretensioned in the direction indicated by the arrow 36 with a certain retracting force will occur when the hinged septum 20 is clamped in position by the fastener 47. The flap 21 will also be forced toward the upper end 46 of the inner wall 26 of the liquid channel 25 by the elastic restoring force exerted in the vicinity of the leaf-spring hinge 34. A sort of form-fit sealing action will thus occur at the sealing surface 53, i.e., where the rim 23 of the flap 21 contacts the inner wall 26 of the liquid channel 25, when the flap 21 is in the closed position 39. For perfect sealing, it will be essential that the width 29 of the flap 21 be slightly less than, or equal to, the inner diameter 27 of the liquid channel 25. The length of the flap 21, measured along the major axis 57 of the ellipse 50, should exceed the width 29 of the flap 21 in order that the desired inclination of the flap 21 when in the closed position 39 will apply. In the closed position, the flap 21 will be inclined at a certain inclination angle 65 that will depend upon the length chosen for the flap 21, and will increase with increasing length of the flap 21 for a given inner diameter 27 of the liquid channel 25.

If the liquid channel 25 has a circular cross-section, the flap 21 will have the shape of a normal ellipse, in which case, the desired sealing action along the sealing surface 53 between the rim 23 of the flap 21 and the internal wall 26 of the liquid channel 25 will reliably occur.

As may be seen from FIG. 2, in the closed position 39, the flap 21 subdivides the liquid channel 25 into a first chamber 31 and a second chamber 32. The elastic restoring force exerted by the hinge 33 will retract the flap 21 in the direction indicated by the arrows 36.1 and 36.2, i.e., toward the first chamber 31, in order that the rim 23 of the flap 21 may abut against the inner wall 25 of the liquid channel 25, thereby forming a valve 30. When the flap 21 is in the closed position 39, i.e., in its sealing position, the liquid channel 25 will be closed off, thereby precluding any unacceptable leakage from the second chamber 32 into the first chamber 31 from occurring, while leakage from the first chamber 31 into the second chamber 32 may occur if the flap 21 is swung and/or swivel to an opened position 38 by an actuating device 37. Its opened position is indicated in FIG. 1 and 2 by the dotted line.

A hollow needle 42 that simultaneously serves as a deposition device 41 for depositing liquid on the contacting and drainage surface 40 on the flap 21 is preferably employed as the actuating device 37. In order to open the flap 21 and deposit liquid thereon, once the tip of the hollow needle 42 has been inserted into the liquid channel 25 and nudged downward until it contacts the contacting and drainage surface 40 the hollow needle 42 is nudged further in the actuating direction 59 in order that the flap 21 will be swung and/or swivel downward, opposite to the direction indicated by the arrows 36.1 and 36.2, about the leaf-spring hinge 34. This will yield a certain gap 54.1 and/or 54.2 that will depend upon the depth to which the hollow needle 42 protrudes into the liquid channel 25. Liquid deposited onto the contacting and drainage surface on the flap 21 using the hollow needle 42 may drain down through that gap 54.1 and/or 54.1 into the second chamber 32 in order to allow, for example, collecting it in a collection vessel or funnel connected to the tubing section 45.

Retracting the hollow needle 42 in a direction opposite to the actuation direction 59 will allow the flap 21 to close once again. Fully retracting the hollow needle 42 from the contacting and drainage surface 40 on the flap 21, will allow achieving a well-defined termination of a stream of liquid, or breakaway of liquid droplets, in the sense of achieving the desired, well-defined, initial and finishing conditions for dispensing volumes of liquid.

In another representation, the invention relates to an arrangement of a flap for the purpose of closing off a tubular liquid channel 25 to be employed on liquid-separation equipment, in particular, fraction collectors, wherein a flap 21 fastened to a hinge 33 is properly installed in a liquid channel 25 and may be actuated, shifting it from a closed position 39 to an opened position 38, whenever desired, wherein the arrangement involved is characterized by a hinged septum 20, whose flap 21 is fabricated from a thin, flexible, elastic foil 22 whose rim 23 is matched to the contour of the inner wall 26 of the liquid channel 25 such that the liquid channel 25 may be sealed along the rim 23 of the flap 21 when the hinged septum 20 is properly installed therein, wherein, in the closed position, the flap 21 is arranged inclined with respect to the longitudinal axis 28 of the liquid channel 25 and the liquid channel 25 is subdivided into a first chamber 31 and a second chamber 32, and wherein the flap 21 is attached to a hinge 33 that exerts an elastic restoring force on the flap 21 directed toward the first chamber 31, i.e., acting along the direction indicated by the arrows 36.1 and 36.2, when the hinged septum is properly installed in the liquid channel 25 in order that the rim 23 of the flap will preferably generate a seal with the inner wall 26 of the liquid channel 25, thereby forming a valve 30, such that, in the sealed state, the liquid channel 25 will be blocked in relation to a drainage of liquid from the second chamber 32 into the first chamber 31, while a drainage of liquid from the first chamber 31 into the second chamber 32 will be possible when the flap is swung to the opened position 38 by an actuating device 37, and wherein the flap 21 has a contacting and drainage surface 40 for the liquid involved, which may be deposited thereon using a deposition device 41, that is arranged on that face 43 of the flap 21 that faces the first chamber 31 when the hinged septum 20 is properly installed in the liquid channel 25.

According to another major representation, the invention relates to a hinged septum 20 having a flap 21 fabricated from a thin, flexible, elastic foil 22. The rim 23 of the flap 21 is matched to the contour of the inner wall 26 of a liquid channel 25 such that the latter may be sealed along the rim 23 of the flap 21 when the hinged septum 20 is properly installed therein. The flap 21 will be inclined with respect to the longitudinal axis 28 of the liquid channel 25 when the latter is in the sealed state. The flap 21 is also attached to a springy, elastic hinge 33 that exerts an elastic restoring force on the flap 21 when the hinged septum 20 is properly installed in the liquid channel 25 in order that the rim 23 of the flap 21 may contact the inner wall 26 of the liquid channel 25, thereby forming a liquid-tight seal therewith. The flap 21 also has a contacting and drainage surface 40 for accommodating liquid, which may be deposited onto the flap 21 using a deposition device 41.

The invention claimed is:

1. An apparatus for dispensing volumes of liquids, comprising:
   a hinged septum installed on a liquid channel, the septum having a positionable flap with hydrophilic and/or hydrophobic pathways, said flap inclined at an inward angle with respect to a longitudinal axis of the liquid channel, and
   a deposition device that deposits liquid on the flap while in contact with the flap.

2. The apparatus of claim 1, wherein the flap includes a rim shaped to substantially match a contour of an inner wall of the liquid channel.

3. The apparatus of claim 1, wherein the flap includes a surface and the flap is positioned so that stream of the liquid terminates on the surface or droplets of the liquid breakaway on the surface.

4. The apparatus of claim 1, wherein the flap comprises an elastic foil.

5. The apparatus of claim 1, wherein the flap subdivides the liquid channel into a first chamber and a second chamber when the flap is positioned to seal the second chamber.

6. The apparatus of claim 5, wherein said septum hinge is attached to the liquid channel and the flap, wherein the hinge exerts an elastic restoring force on the flap directed toward the first chamber.

7. The apparatus of claim 1, wherein the flap comprises a surface at which the deposition device contacts the flap.

8. The apparatus of claim 5, wherein the flap comprises a surface that faces the first chamber and is contacted by the deposition device.

9. The apparatus of claim 1, wherein the flap includes a rim that contacts an inner wall of the liquid channel, forming a liquid-tight seal therewith, thereby forming a valve, such that, in the sealed state, the liquid channel will be blocked with respect to leakage of liquid from a second chamber into a first chamber, while leakage of liquid from the first chamber into the second chamber will be possible when the flap is swung to an opened position by an actuating device of the deposition device.

10. The apparatus of claim 1, including a single hinge attached to the flap near a rim of the flap.

11. The apparatus of claim 1, wherein the septum hinge comprises a leaf-spring.

12. The apparatus of claim 1, wherein the septum hinge and flap form a monolithic structure.

13. The apparatus of claim 1, wherein the septum hinge is fixed to a fastener fixed to the liquid channel.

14. The apparatus of claim 1, wherein the septum hinge is fixed to the liquid channel.

15. The apparatus of claim 1, wherein the hinged septum includes a hinge and a gasket base; and a first end of the hinge is attached to the flap and a second end of the hinge is attached to the gasket base.

16. The apparatus of claim 15, wherein the septum hinge, flap, and the gasket base form a monolithic structure.

17. The apparatus of claim 6, wherein the septum hinge and the flap are fabricated from a flexible elastic foil.

18. The apparatus of claim 1, wherein the flap comprises a rim in the form of an ellipse.

19. The apparatus of claim 18, wherein the septum hinge is arranged along a major axis of the ellipse.

20. The apparatus of claim 17, wherein the foil has a thickness less than either a width of the flap or an inner diameter of the liquid channel.

21. The apparatus of claim 20, wherein the thickness of the foil is less than ⅟₅₀ of either the width of the flap or the inner diameter of the liquid channel.

22. The apparatus of claim 17, wherein the flap is configured such that it may swivel and/or twist and/or buckle when acted upon by the restoring force exerted by the hinge.

23. The apparatus of claim 3, wherein the surface includes said pathways in the form of mutually parallel microchannels.

24. The apparatus of claim 23, wherein the surface has a sawtooth profiled cross section at an angle to the microchannels.

25. The apparatus of claim 23, wherein the microchannels extend away from the hinge.

26. The apparatus of claim 24, wherein the microchannels extend away from the hinge.

27. A method for dispensing volumes of liquids, comprising:
  installing into a liquid channel a hinged septum having a flap with hydrophilic and/or hydrophobic pathways, said flap inclined at an angle with respect to a longitudinal axis of the liquid channel, and
  using a deposition device to contact the flap and deposit a liquid on a surface of the flap.

28. The method of claim 27, further comprising using the deposition device as an actuating device for swinging the flap from a closed position to an opened position.

* * * * *